United States Patent
Stoller

(10) Patent No.: US 6,739,088 B1
(45) Date of Patent: May 25, 2004

(54) PROTECTIVE WINTER TURF COVER

(76) Inventor: James E. Stoller, 814 Tuckaway Ct., Twin Lakes, WI (US) 53181

( * ) Notice: Subject to any disclaimer, the term of this patent is extended or adjusted under 35 U.S.C. 154(b) by 196 days.

(21) Appl. No.: 10/032,652

(22) Filed: Nov. 13, 2001

(51) Int. Cl.[7] .................. A01G 13/00; A47G 7/08
(52) U.S. Cl. .................. 47/31; 47/9; 47/2; 442/370; 442/327; 428/319.9; 428/338; 428/339; 428/424.8
(58) Field of Search .............. 473/504; 47/32, 47/31, 20.1, 29.4, 29.1, 26, 23.1, 9, 2; 442/3.7, 327; 428/319.9, 338, 339, 424.8

(56) References Cited

U.S. PATENT DOCUMENTS

| | | | |
|---|---|---|---|
| 983,857 A | * 2/1911 | Clarke | 473/504 |
| 2,401,997 A | * 6/1946 | Whitman | 47/31 |
| 3,863,387 A | 2/1975 | Webster et al. | 47/29 |
| 3,864,198 A | * 2/1975 | Jackson | 57/259 |
| 4,088,805 A | * 5/1978 | Wiegand | 428/310 |
| 4,128,689 A | * 12/1978 | Heaps et al. | 428/317.1 |
| 4,267,665 A | 5/1981 | Wallace et al. | 47/26 |
| 4,632,329 A | 12/1986 | Burley | 242/86.52 |
| 4,685,155 A | 8/1987 | Fingerhut et al. | 2/272 |
| 4,798,023 A | 1/1989 | Morssinkhof et al. | 47/26 |
| 4,980,991 A | * 1/1991 | Kipnees et al. | 47/2 |
| 5,070,643 A | 12/1991 | Hinsperger | 47/31 |
| 5,262,233 A | * 11/1993 | Sudo et al. | 428/327 |
| 5,275,860 A | * 1/1994 | D'Luzansky et al. | 428/71 |
| 5,401,118 A | * 3/1995 | Kramer | 405/129.9 |
| 5,532,043 A | * 7/1996 | Terashi et al. | 428/152 |
| 5,833,401 A | 11/1998 | Olson | 405/258 |
| 5,981,020 A | 11/1999 | Sutherland et al. | 428/85 |
| 6,074,966 A | 6/2000 | Zlatkus | 442/413 |
| 6,093,481 A | * 7/2000 | Lynn et al. | 428/217 |
| 6,115,960 A | 9/2000 | Posa | 47/28.1 |
| 6,127,027 A | 10/2000 | Nogami et al. | 428/220 |
| 6,127,293 A | * 10/2000 | Kimura et al. | 442/199 |
| 6,168,840 B1 | 1/2001 | Johnstone | 428/36.91 |
| 6,245,697 B1 | 6/2001 | Conrad et al. | 442/370 |

FOREIGN PATENT DOCUMENTS

CH 612321 * 7/1979 .......... A01G/13/02

* cited by examiner

Primary Examiner—Peter M Poon
Assistant Examiner—Andrea M. Valenti
(74) Attorney, Agent, or Firm—Mathew R. P. Perrone, Jr.

(57) ABSTRACT

A protective winter turf cover is formed with a layered polyethylene laminated sheet with each layer having force striations running at an angle to the edge of the sheet and with the force striations of one layer at an angle to the force striations of the adjacent layer, the resulting turf cover being lightweight, compactly foldable, and substantially impermeable to water.

14 Claims, 5 Drawing Sheets

PROTECTIVE WINTER TURF COVER

BACKGROUND OF THE INVENTION

The increased popularity of golf throughout the world has led to a substantial increase in the need for more golf courses. Additionally, every day, on which a golf course stays open if it would normally be closed, increases the effectiveness and profitability of the course. In the Northern climates, competitiveness to stay open as late in the fall and open as early as possible in the spring is the challenge faced by today's golf course superintendents.

Besides the need to be open early in the spring, the golfers also demand an excellent putting surface right away and throughout the year. As a result of this competition for golfers, courses need to be the best and open at all costs to make the money. In the Southern climates, this is not very difficult, except for rainy days.

The picture changes in the Northern climates, however. Almost all golf courses in the Northern climates close down for the winter. The golf courses then reopen once the courses, and especially the greens, are in condition for the golfers to use without causing injury to themselves or damage to greens.

Traditionally, a golf course uses a composition, generically referred to a top dressing, to cover the putting surface or golf green in an attempt to protect the green during the winter season. Top dressing is usually a mixture of sand with soil or peat, which is placed over the top of the green in order to protect the grass during the winter months. From the years of experience, it becomes clear, that this top dressing composition and method of application do not always protect the turf from winter injury.

For a golf course putting surface or green, grass is visible. Directly below the surface grass is the crown, which is invisible from the green's surface. Directly below the crown are the roots of the grass or putting surface, which roots are also invisible from the green's surface.

A major problem for a golf course putting surface or green is crown hydration. Crown hydration is the number one killer of turf on putting greens during any given winter season. Crown hydration results from the freeze and thaw cycles of winter weather. Almost any cover on a golf green permits water to penetrate through this surface of the golf course green.

As this water penetrates to the green, it comes into contact with the crown. It is common for the water, which has penetrated through the cover and into the green, to refreeze and cause great damage to the crown, and, hence, the root system of the green. Such damage is called crown hydration of the green and causes major problems in getting the green ready to play.

Presently, other protection methods are being used, including; expanded particle products, straw, and lace coated or woven polyethylene. These methods or devices provide somewhat effective methods of protecting greens during the winter.

However, there is a very fine line between protecting and overprotecting a green, especially during midwinter or early spring growth. The present method of the expanded particle blanket often insulates the turf too much on sunny winter days, especially those days where snow cover is lacking, and over stimulates the turf into a falsified sense of spring and the grass starts to grow. Such growth at this time is not acceptable for providing an acceptable green.

Life expectancy for the expanded products is about three years. If used more than the three years, it can easily lead to crown hydration. The expanded products, with their two inches of thickness, create many problems. Such insulating foamed, characteristics make them bulky, hard to store, handle and dispose of when their usefulness is gone.

The lace-coated cover is an effective cover only as long as water does not penetrate therethrough. However, it is lace coated, that is to say that are apertures in the coating, thereby allowing water to penetrate the cover and get to the turf or crown underneath. As previously explained, there are certain problems with allowing the protective cover to breathe during the course of the winter. If the temperature alone warms the snow, it will allow moisture to pass through cover and possibly causing crown hydration to the turf underneath.

Another drawback of early or midwinter growth, is that before the covers are placed over the turf, chemicals are applied to protect against particular turf diseases associated with winter dormancy and spring growth. If early growth occurs, these chemicals are then absorbed into the root too early. This early absorption requires that the covers be removed and the chemicals reapplied. This is a waste of time, chemicals and money.

Also, the protective covers must be easily removed to save labor and time, while still allowing for removal, in order for the golf course to be used during midwinter warm spells. Private courses can charge anywhere from $60.00 to $200.00 and up per round per golfer. Assuming four golfers per round at 30 rounds per day, the income can range from $7,200.00 per day to $24,000.00 and up for every extra day of play in gained revenue by having the turf open for play on warm winter days, instead of closed as is the standard procedure.

Another problem with existing covers is that neither rapid cooling nor rapid warming can be prevented. Yet without this ability, the most undesired crown hydration occurs, usually in a very rapid fashion.

A protective turf cover must have at least five desirable qualities. Firstly, it must protect the turf from excessive moisture gain in the crown area. Secondly, it must protect the turf without over stimulating the turf to make it come out of the dormancy too early in the spring.

Thirdly, a cover must be easily removable if weather warms sufficiently in order to allow play to resume, at a time when the course is not otherwise playable. Large amounts of revenue can be lost in some climates if greens are covered, the weather warms enough to allow play, but too much time and money is needed to remove the green covers to allow play to be resumed.

Fourthly, any cover must last as long as possible. A life expectancy of at least three to more than seven years is a must to cut costs on reorders and old cover disposal. Fifth, the covers must be fabricated from a material, which can be folded and stored into as small as space as possible.

SUMMARY OF THE INVENTION

Among the many objectives of this invention is the provision of a golf green cover, which permits a golf green to be used in efficient fashion.

A further objective of this invention is the provision of a golf green cover, which prevents crown hydration.

Yet a further objective of this invention is the provision of a golf green cover, which greatly reduces crown hydration.

A still further objective of this invention is the provision of a golf green cover, which is easily installed.

Another objective of this invention is the provision of a golf green cover, which is easily stored.

Yet another objective of this invention is the provision of a golf green cover, which is easily folded.

Still, another objective of this invention is the provision of a golf green cover, which is easily unfolded.

Also, an objective of this invention is the provision of a protective winter turf cover, which may be easily disposed of at the end of its useful life.

A further objective of this invention is the provision of a protective winter turf cover, which has repeated uses.

A still further objective would be to provide a cover, which will delay rapid cooling.

Yet a further objective would be to provide a cover, which will delay rapid warming.

These and other objectives of the invention (which other objectives become clear by consideration of the specification, claims and drawings as a whole) are met by providing a protective winter turf cover from a layered polyethylene laminated sheet with each layer having force striations running at an angle to the edge of the sheet and with the force striations of one layer at an angle to the force striations of the adjacent layer, thereby forming a turf cover, which is lightweight, compactly foldable, and substantially impermeable to water.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
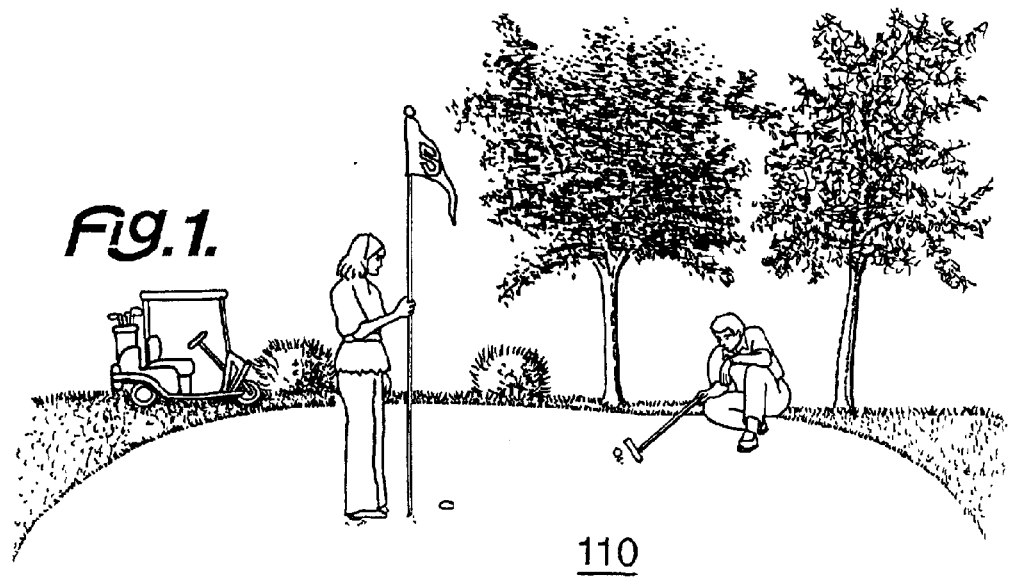
FIG. 1 depicts a perspective view of a standard a golf green 110.

In accordance with the present invention, a temporary protective winter turf cover, as a protective cover, is provided for a grass surface, especially a golf green. Any polymer capable of being formed into a light weight, flexible sheet is suitable for forming winter turf cover. In a preferred form, the protective winter turf cover is formed from at least one polyethylene sheet. The preferred polyethylene will be discussed below Each polyethylene sheet has at least two layers of laminated polyethylene as its base. Preferably, each layer in the polyethylene sheet is in an orientated cross laminated fashion to provide strength and integrity to the cover. The covers are preferably factory seamed to the largest piece manageable, in order to provide both a one-piece for a green and a water tight barrier between the weather elements and the underlying turf. For a particular golf course, each turf cover can be labeled for its respective green in a standard fashion.

The protective winter turf cover is formed with a layered polyethylene laminated sheet with each layer having force striations running at an angle to the edge of the sheet and with the force striations of one layer at an angle to the force striations of the adjacent layer, the resulting turf cover being lightweight, compactly foldable, and substantially impermeable to water.

In a preferred form, each layer is preferably rectangular and has force striations running at an acute angle to an edge. Preferably the acute angle is about 20 to about 70 degrees relative to the edge of the layer. In a more preferred form, the force striations are running at an angle of about thirty degrees to about sixty degrees relative to the edge of the layer. In the most preferred form, the force striations are running at an angle of about forty degrees to about fifty degrees relative to the edge of the layer.

With two layers being laminated adjacent to each other, the relative angle between the striations of each layer ranges from about sixty degrees to about 120 degrees. In a more preferred form, the relative angle between the striations of each layer ranges from about 70 degrees to about 110 degrees. In most preferred form, the relative angle between the striations of each layer ranges from about 80 degrees to about 100 degrees.

Due to the particular structure of the cover, rapid cooling or rapid warming of the covered golf green is avoided. While it is not desired to bound by any particular theory, the following postulate is offered for this success. The impermeability of the cover combined with the ultra white color provides a cover which will substantially delay either rapid cooling or rapid warming. The ultra white reflects sunlight and delays heating. The impermeability prevents undesired water contact.

The turf cover of the present invention provides a protective turf cover that has many advantages. There are at least five outstanding advantages of this turf cover. First, the turf cover protects the turf from excessive moisture gain in the crown area. Second, the turf cover protects the turf without over stimulating the turf to make it come out of the dormancy too early in the spring. Third, a cover must be able to be easily removed if weather, typically winter weather, warms and allows play to resume. Fourth, a cover must be able to be easily replaced, when, again typically winter weather, if the weather cools and requires play to cease.

Large amounts of revenue can be lost in some climates if greens are covered, the weather warms enough to allow play, but too much time and money is needed to remove the green covers to allow play to be resumed.

Fifth, covers must last as long as possible. A life expectancy of three to seven years is a must to amortize costs on reorders and old cover disposal. Fifth, the covers must be fabricated from a material, which can be folded and stored into as small as space as possible.

In one illustrative embodiment, the sheets used to cover the turf are generally flat rectangles, having a flap on one end to accommodate field seaming of the pieces for larger areas. The flap provides for the joining of one sheet to another in an efficient manner in the field, and reduces the bulk of the sheet carried to the field.

In a most preferred embodiment, the sheets used to cover the turf are generally flat rectangles joined together by an adhesive at the edge thereof. Enough sheets are used to form a winter turf cover for a golf green. Because of the foldability and flexibility of the individual sheets, the winter turf cover for each golf green retains the flexibility and storability as well as the required ease of installation and removal.

In another preferred embodiment, the protective covers have attached thereto, various thicknesses of a foam layer to act as the aforementioned cold weather insulator. The foam layer may also be sandwiched therebetween.

The foam layer is thin enough and flexible enough to maintain the ease of handling required. The thinness of the foam is believed to be operable because of the sheet orientation in the layers of turf cover.

The thickness of the foam layer can be empirically determined by the insulation factor or by the location of a golf course, especially in relationship to the geographical location and general layout and its relationship to the surrounding foliage and elevation of the proposed area. Having a variable foam thickness or none at all will provide the user with variable choices in turf covers that are currently unavailable.

Due to the structure of the sheets, the foam layer can be much thinner than other foam-containing sheets of the prior art. In this manner, even with the thin foam layer, such sheets can be easily stored and carry out the other desired functions.

Figure 2:
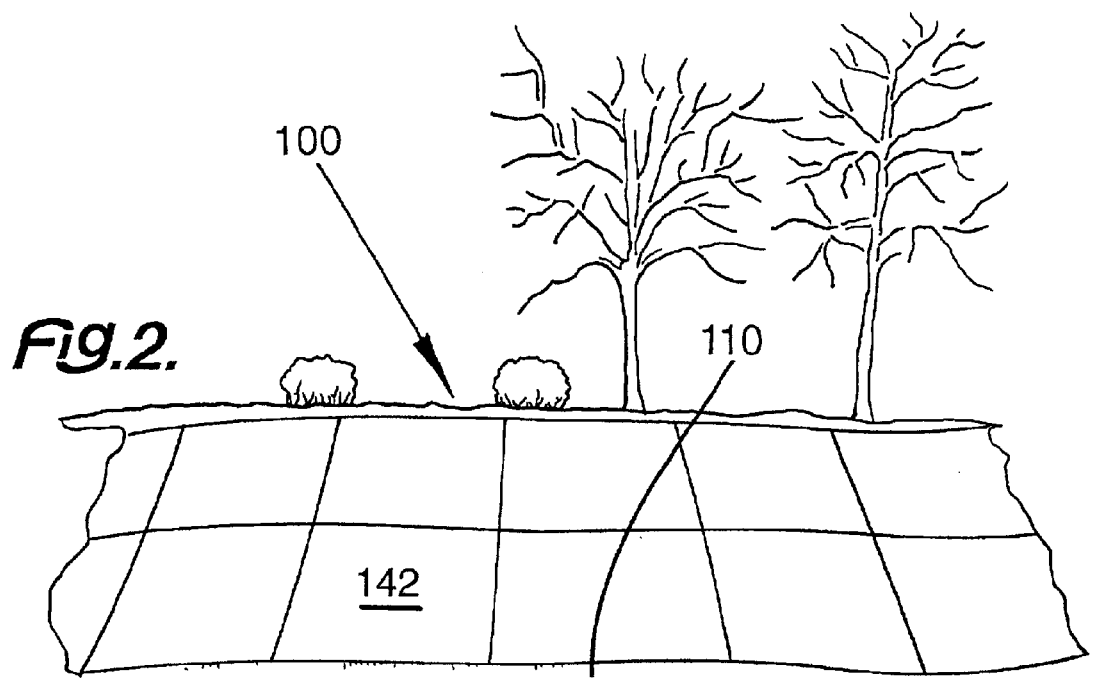
FIG. 2 depicts a perspective view of the winter turf cover 100 of this invention being installed on a golf green 110.

Referring now to FIG. 1 and FIG. 2, a winter turf cover 100 is placed over a golf green 110. The laminated structure of the winter turf cover 100 provides for a lightweight, substantially durable and water-impermeable material. By keeping water or snow from contacting or penetrating golf green 110, crown hydration during winter months of colder climates is avoided.

Figure 3:
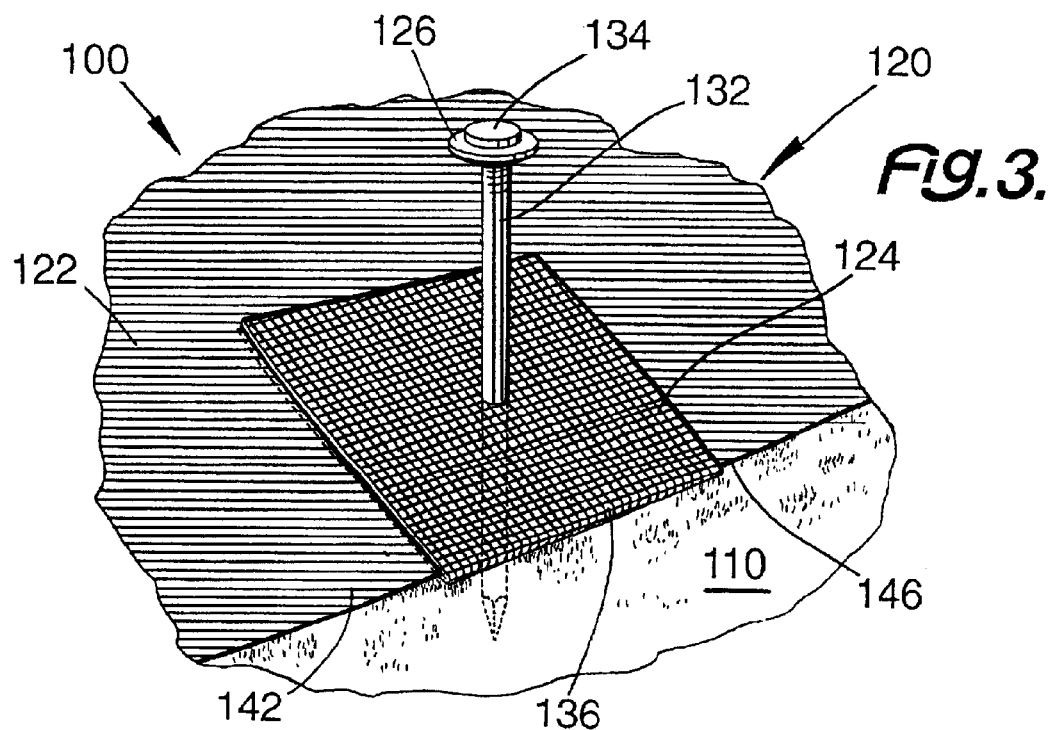
FIG. 3 depicts a perspective view of a ground holding device 120 for the winter turf cover 100 of this invention being installed on a golf green 110.
Figure 4:
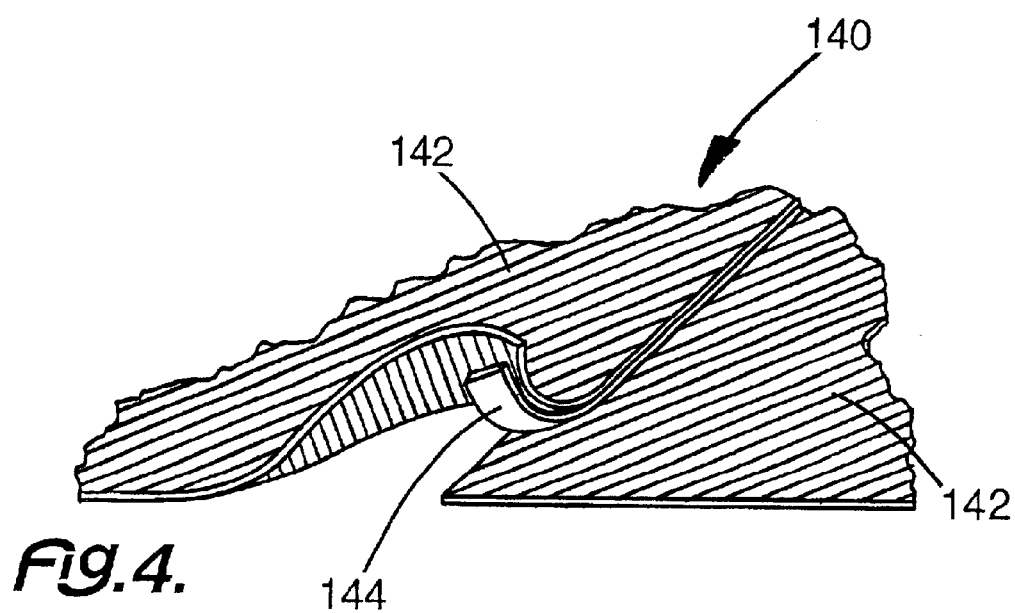
FIG. 4 depicts a perspective view of the panel edge joining device 140 for panels 142 of cover 100 of this invention.
Figure 5:
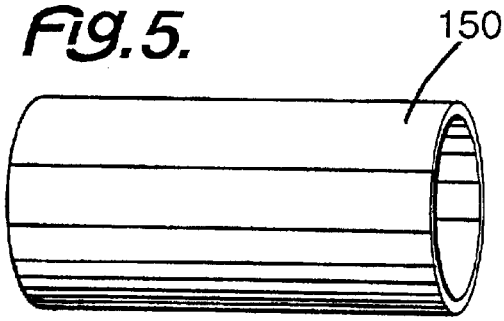
FIG. 5 depicts a perspective view of a plain polyethylene tube 150 used to form the winter turf cover 100 of this invention.
Figure 6:
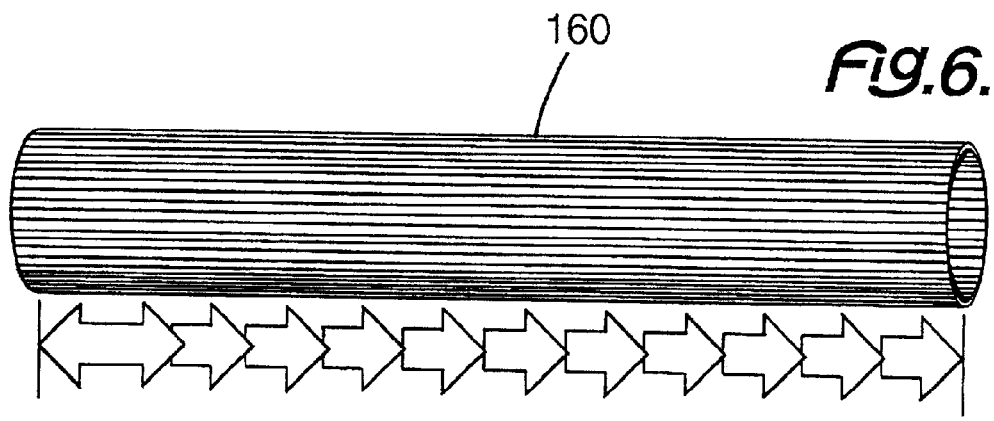
FIG. 6 depicts a perspective view of an oriented, stretched, polyethylene tube 160, based on plain tube 150, used to form the winter turf cover 100 of this invention.
Figure 7:
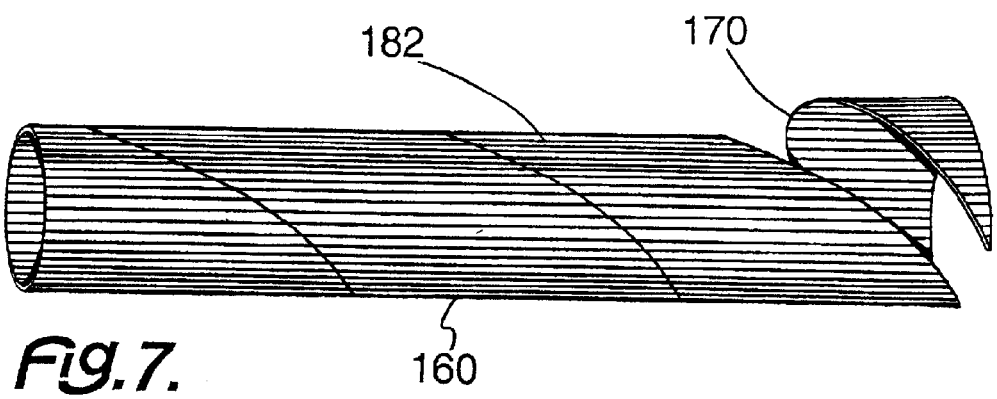
FIG. 7 depicts a perspective view of a spiral cut 170 of the oriented, stretched tube 160, used to form the winter turf cover 100 of this invention.
Figure 8:
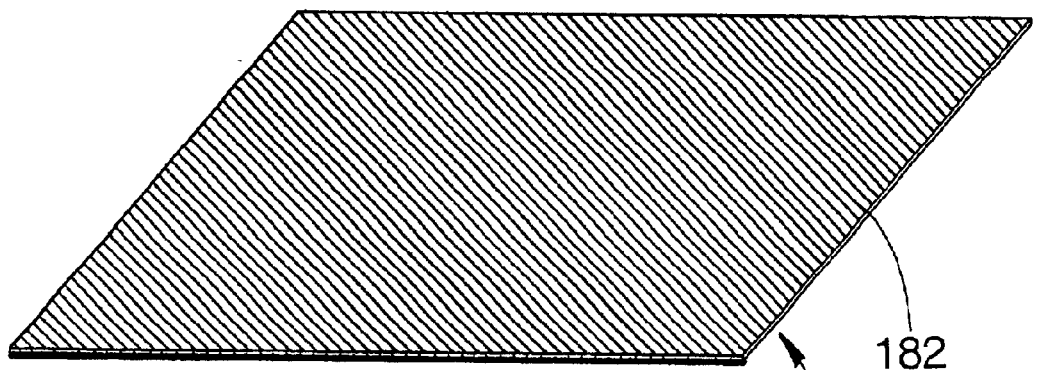
FIG. 8 depicts a perspective view of an oriented sheet 180 based on spiral cut 170 of the stretched polyethylene tube 160, used to form the winter turf cover 100 of this invention.

Adding FIG. 3 and FIG. 4 depicts a perspective view of a ground holding device 120 for the winter turf cover 100. One part of ground holding device 120 includes at various positions in the fabric 122 of the winter turf cover 100 are reinforced tabs 124. Each reinforced tab 124 serves to receive a nail 132 or have nail 132 removed therefrom a plurality of times for panels 142 to form the winter turf cover 100 of this invention.

Through each reinforced tab 124 may have a nail 132 with a slide washer 126 between the nail head 134 and the reinforced tab 124 in order to hold turf cover 100 in place. Such reinforced tabs 124 are on one, two, three or four sides of a preferably rectangular fabric 122. Thus, each reinforced tab 124 and each nail 132 provide part of ground holding device 120.

In a preferred form, reinforced tab 124 is formed by applying heavy tape 136 on one or both sides of panel 142. The panel 142, at a section thereof, is between two pieces of tape 136. Tape 136 seals panel 142 as slide washer 126 forced by nail 132 in general and nail head 134 in particular to the golf green 110.

For the most part, tape 136 is placed at the edge of panel 142. However, when an undulating version of green 110 is covered, nails 132 through panel 142 away from the edge 146 of panel 142 into golf green 110, may be sealed by tape 136.

Also as a part of ground holding device 120 is a panel edge joining device 140, for those situations when the turf cover 100 is not one piece. Panel edge joining device 140 permits one panel 142 to be joined to at least one other panel 142 in order to form winter turf cover 100, and maintain the required impermeability. Panel edge joining device 140 may be situated on one, two, three, or four sides of the preferably rectangular fabric 122. With panel edge joining device 140, sheets of rectangular fabric 122 may be joined to form winter turf cover 100.

Panel edge joining device 140 may have any desired structure. In a preferred form, panel 142 has an adhesive edge 144 to form an aggressive joining system. This adhesive edge 144 or joining material is then applied to a second, third or more of panel 142, while overlapped to create permanent, impermeable sheet of the winter turf cover 100 as required to cover a golf green 110, as required for each application.

In a preferred form, each cover 100 is preformed. Thus adhesive edge 144 is formed on panel 142 and adhered to a second panel 142. Adhering is accomplished in any suitable fashion, obviously to avoid compromising the impermeability of the cover. The seaming is done in any suitable fashion.

The preferred adhesive seaming is accomplished by either high speed extrusion or by hot-air, rotational sealing. Thus, preferably, prior to shipping, covers are manufactured to specifications and therefore received in a full size configuration. No field seaming, is required. Because of the structure, of the cover, it may be easily folded, even as full sized. The cover may even be marked to simplify placement of the cover on the green.

It is also possible for winter turf cover 100 to be circular or any other desired shape in order to cover the green. What is critical for the winter turf cover 100 is that the cover 100 be impermeable to water.

Adding FIG. 5, FIG. 6, FIG. 7, and FIG. 8 combine to depict the formation of fabric 122 or winter turf cover 100. A plain tube 150, preferably of polyethylene, is stretched to form a grained or stretched tube 160, based on plain tube 150. Stretched tube 160 undergoes a spiral cut 170 of the stretched tube 160, used to form the winter turf cover 100. Spiral cut 170 of stretched tube 160 permits a grained sheet 180 to be formed. Grained sheet 180 has force striations 182, which run at 45 degree angles to the edge of the grained sheet 180.

Figure 9:
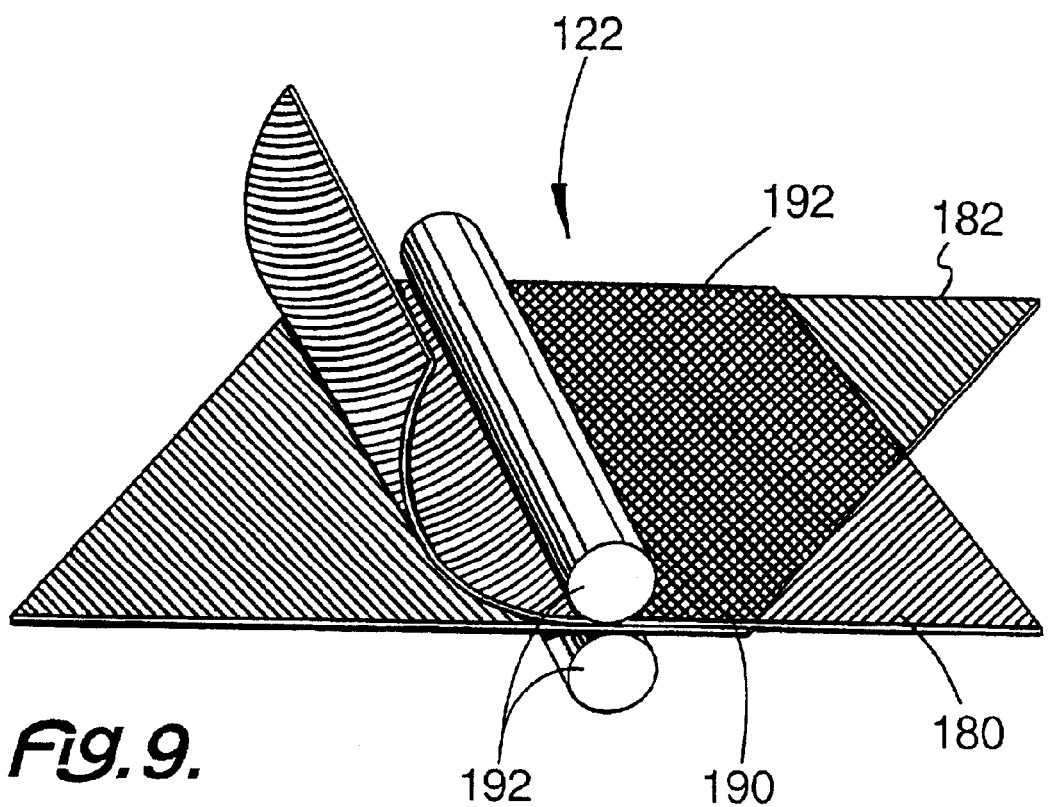
FIG. 9 depicts a perspective view of a three sheet cross lamination 190 based on oriented sheet 180, used to form the winter turf cover 100 of this invention.

Adding FIG. 9 to the consideration, a cross lamination with force striations 182 of the sheets and angles is depicted. Such structure preferably provides protection from the water and permit formation of panels 142 and thence winter turf cover 100 of this invention. Thus, this use of cross grains and lamination provide the contact turf cover 100 with water-impermeability and high puncture resistance.

Figure 10:
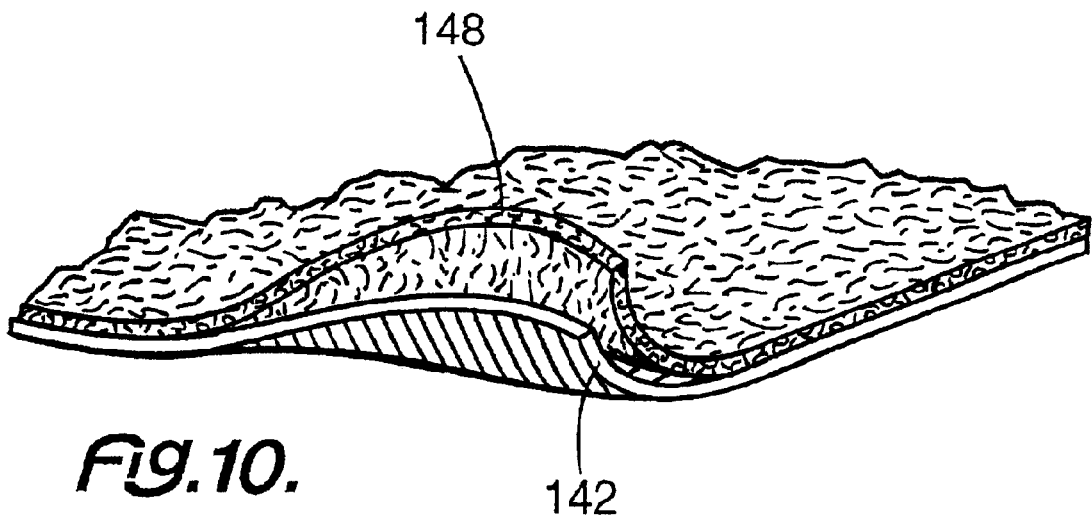
FIG. 10 depicts a perspective view of a panel 142 with foam 148 thereon.
Figure 11:
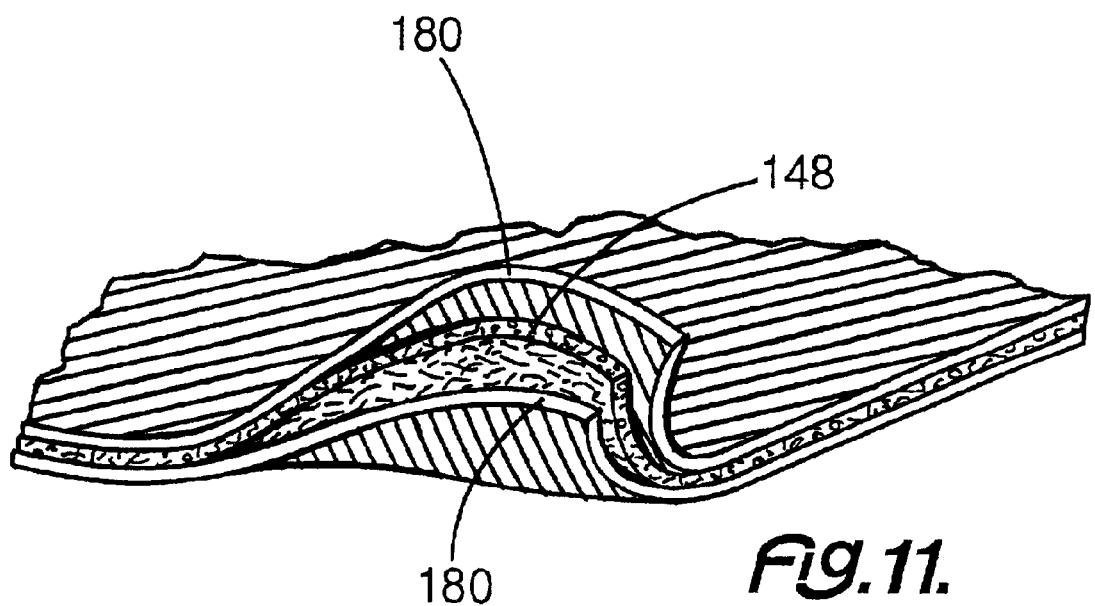
FIG. 11 depicts a perspective view of a panel 142 with foam 148 therein.

FIG. 10 and FIG. 11 combine to show the use of a foam layer 148. In FIG. 10, foam layer 148 is exposed on sheet 180. In FIG. 11, foam layer 148 is sandwiched between two of sheet 180. The foam layer 148 is provided in any suitable fashion with minimized reduction in the storability and other desired features winter turf cover 100. This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A lightweight, compactly foldable, protective winter turf cover comprising:
   (a) at least one layered polyethylene sheet being substantially water impermeable;
   (b) the layered polyethylene sheet having at least a first layer and a second layer;
   (c) the first layer and the second layer each having a directional orientation determined by force striations;
   (d) the directional orientation of the first layer being at an angle relative to the directional orientation of the second layer;
   (e) the turf cover being durable;
   (f) the first layer having a first edge;
   (g) the second layer having a second edge;
   (h) the force striations being at an acute angle to the first edge;
   (i) the force striations being at an acute angle to the second edge;
   (j) the acute angle of the first edge being at a relative angle to the acute angle of the second edges;
   (k) the acute angle to the first edge and the acute angle to the second edge being 20 to about 70 degrees; and
   (l) the relative angle between the first layer and second layer being about sixty degree to about 120 degrees.

2. The lightweight, compactly foldable, protective winter turf cover of claim 1 further comprising:
   (a) the acute angle to the first edge and the acute angle to the second edge being 30 to about 60 degrees; and
   (b) the relative angle between the first layer and second layer being about seventy degrees to about 110 degrees.

3. The lightweight, compactly foldable, protective winter turf cover of claim 2 further comprising:
   (a) the acute angle to the first edge and the acute angle to the second edge being 40 to about 50 degrees; and
   (b) the relative angle between the first layer and second layer being about eighty degrees to about 100 degrees.

4. The lightweight, compactly foldable, protective winter turf cover of claim 1 further comprising:
   (a) the at least one layered polyethylene sheet being at least a first layered polyethylene sheet and at least a second layered polyethylene sheet; and
   (b) the first layered polyethylene sheet and the second layered polyethylene sheet being secured with an adhesive in an edge to edge to form at least a part of the winter turf cover.

5. The lightweight, compactly foldable, protective winter turf cover of claim 4 further comprising:
   (a) the adhesive forming a water tight barrier; and
   (b) a foam layer being added to the winter turf cover.

6. The lightweight, compactly foldable, protective winter turf cover of claim 5 further comprising the first layered polyethylene sheet being between the foam layer and the second layered polyethylene sheet.

7. The lightweight, compactly foldable, protective winter turf cover of claim 5 further comprising the foam layer being between the first layered polyethylene sheet and the second layered polyethylene sheet.

8. The lightweight, compactly foldable, protective winter turf cover of claim 4 further comprising:
   (a) the acute angle to the first edge and the acute. angle to the second edge being 40 to about 50 degrees;
   (b) the relative angle between the first layer and second layer being about eighty degrees to about 100 degrees;
   (c) the at least one layered polyethylene sheet being enough layered polyethylene sheets to form the protective winter turf cover into a size sufficient to cover a golf green; and
   (d) a securing device being adapted to receive a holding means to releasably secure the protective winter turf cover to the golf green.

9. The lightweight, compactly foldable, protective winter turf cover of claim 8 further comprising:
   (a) at least one tape being applied to the edge;
   (b) the at least one tape being adapted to receive a holding means in order to secure the winter turf cover to the golf green; and
   (c) the at least one tape minimizing damage to the layered polyethylene sheet in order to permit reuse of the winter turf cover on the golf green.

10. A lightweight, compactly foldable, protective winter turf cover comprising:
    (a) at least one layered polymer capable of being formed into a light weight, flexible sheet being substantially water impermeable;
    (b) the layered polymer sheet having at least a first layer and a second layer;
    (c) the first layer and the second layer each having a directional orientation determined by force striations;
    (d) the directional orientation of the first layer being at an angle relative to the directional orientation of the second layer;
    (e) the first layer having a first edge;
    (f) the second layer having a second edge;
    (g) the force striations being at an acute angle of about 20 to about 70 degrees to the first edge;
    (h) the force atriations being at an acute angle to the second edge; and
    (i) the acute angle of the first edge being at a relative angle to the acute angle of the second edge.

11. The lightweight, compactly foldable, protective winter turf cover of claim 10 further comprising:
    (a) the acute angle to the first edge and the acute angle to the second edge being 40 to about 50 degrees; and
    (b) the relative angle between the first layer and second layer being about eighty degrees to about 100 degrees.

12. The lightweight, compactly foldable, protective winter turf cover of claim 11 further comprising;
    (a) the at least one layered polyethylene sheet being at least a first layered polyethylene sheet and at least a second layered polyethylene sheet;
    (b) the first layered polyethylene sheet and the second layered polyethylene sheet being secured with an adhesive in an edge to edge to form at least a part of the winter turf cover;
    (c) the adhesive forming a water tight barrier;
    (d) a foam layer being added to the winter turf cover;

(e) the acute angle to the first edge and the acute angle to the second edge being 40 to about 50 degrees;

(f) the relative angle between the first layer and second layer being about 60 degrees to about 100 degrees; and (g) the at least one layered polyethylene sheet being a sufficient of layered polyethylene sheets to form the protective winter turf cover into a size sufficient to cover a golf green.

13. The lightweight, compactly foldable, protective winter turf cover of claim 12 further comprising:

(a) the at least one layered polyethylene sheet having a white color in order to reflect sunlight; and (b) the at least one layered polyethylene sheet being water impermeable in order to prevent crown hydration.

14. The lightweight compactly foldable, protective winter turf cover of claim 12 further comprising:

(a) the at least one layered polyethylene sheet having a white color in order to reflect sunlight on a golf course green;

(b) the at least one layered polyethylene sheet being formed from a spiral cut 170 of a stretched tube; and (c) the at least one layered polyethylene sheet being water impermeable in order to prevent crown hydration of the golf course greens.

\* \* \* \* \*